United States Patent
Muller-Sellak et al.

(10) Patent No.: US 12,065,593 B2
(45) Date of Patent: Aug. 20, 2024

(54) POLYURETHANE-BASED COMPOSITION

(71) Applicant: BOSTIK SA, Colombes (FR)

(72) Inventors: Saïda Muller-Sellak, Venette (FR);
Adeline Brunel, Venette (FR)

(73) Assignee: Bostik SA, Colombes (FR)

( * ) Notice: Subject to any disclaimer, the term of this patent is extended or adjusted under 35 U.S.C. 154(b) by 990 days.

(21) Appl. No.: 17/044,006

(22) PCT Filed: Apr. 3, 2019

(86) PCT No.: PCT/FR2019/050768
§ 371 (c)(1),
(2) Date: Sep. 30, 2020

(87) PCT Pub. No.: WO2019/193279
PCT Pub. Date: Oct. 10, 2019

(65) Prior Publication Data
US 2021/0032517 A1    Feb. 4, 2021

(30) Foreign Application Priority Data

Apr. 4, 2018    (FR) ..................... 1852924

(51) Int. Cl.
| | |
|---|---|
| *C08G 18/12* | (2006.01) |
| *C08G 18/22* | (2006.01) |
| *C08G 18/32* | (2006.01) |
| *C08G 18/42* | (2006.01) |
| *C08G 18/48* | (2006.01) |
| *C08G 18/66* | (2006.01) |
| *C08G 18/72* | (2006.01) |
| *C08G 18/73* | (2006.01) |
| *C08G 18/76* | (2006.01) |
| *C09J 175/12* | (2006.01) |

(52) U.S. Cl.
CPC ............ *C09J 175/12* (2013.01); *C08G 18/12* (2013.01); *C08G 18/227* (2013.01); *C08G 18/3228* (2013.01); *C08G 18/4238* (2013.01); *C08G 18/4825* (2013.01); *C08G 18/6685* (2013.01); *C08G 18/721* (2013.01); *C08G 18/73* (2013.01); *C08G 18/7621* (2013.01)

(58) Field of Classification Search
None
See application file for complete search history.

(56) References Cited

U.S. PATENT DOCUMENTS

| | | | | |
|---|---|---|---|---|
| 9,683,152 B2 * | 6/2017 | Kelch | ..................... | B32B 7/12 |
| 2004/0259968 A1 * | 12/2004 | Krebs | ..................... | C09J 175/04 |
| | | | | 528/84 |
| 2008/0289761 A1 * | 11/2008 | Bosshard | ..................... | C08G 18/12 |
| | | | | 524/590 |
| 2009/0035506 A1 * | 2/2009 | Pind | ..................... | C08G 18/3215 |
| | | | | 156/331.7 |
| 2009/0044907 A1 * | 2/2009 | Tribelhorn | ..................... | C08G 18/0895 |
| | | | | 525/403 |
| 2012/0301729 A1 * | 11/2012 | Schmider | ..................... | C08G 18/1875 |
| | | | | 156/305 |
| 2013/0288060 A1 * | 10/2013 | Pind | ..................... | C08G 18/36 |
| | | | | 554/68 |
| 2015/0203728 A1 * | 7/2015 | Burckhardt | ..................... | C09J 175/08 |
| | | | | 156/331.7 |
| 2015/0247075 A1 * | 9/2015 | Thiele | ..................... | C08G 18/6696 |
| | | | | 524/872 |
| 2016/0053147 A1 * | 2/2016 | Kelch | ..................... | C08G 18/10 |
| | | | | 428/423.1 |
| 2017/0369632 A1 * | 12/2017 | Pela | ..................... | C09J 175/08 |
| 2018/0371238 A1 * | 12/2018 | Okamoto | ..................... | C08G 18/4247 |
| 2019/0002624 A1 | 1/2019 | Sanz | | |
| 2019/0300766 A1 * | 10/2019 | Pardal | ..................... | C09J 175/08 |
| 2019/0322914 A1 * | 10/2019 | Kelch | ..................... | C04B 40/065 |
| 2020/0017627 A1 * | 1/2020 | Kelch | ..................... | C04B 26/16 |
| 2020/0239752 A1 * | 7/2020 | Kaffee | ..................... | F03D 1/0675 |

FOREIGN PATENT DOCUMENTS

| | | | | |
|---|---|---|---|---|
| JP | H101607 A | 1/1998 | | |
| WO | 2017109382 A1 | 6/2017 | | |
| WO | WO-2017099196 A1 * | 6/2017 | ............. | C08G 18/08 |
| WO | 2018011491 A1 | 1/2018 | | |

OTHER PUBLICATIONS

ISA/EP; International Search Report and Written Opinion for International Patent Application No. PCT/FR2019/050768 dated Jul. 12, 2019, 11 pages.

* cited by examiner

*Primary Examiner* — Robert S Loewe
(74) *Attorney, Agent, or Firm* — NK Patent Law

(57) ABSTRACT

The present invention relates to a composition comprising: —an —NCO component comprising: A) at least one polyurethane comprising at least two NCO end groups obtained by polyaddition reaction: of a composition comprising at least one diisocyanate, of a composition comprising at least one polyol, B) at least one polyisocyanate comprising at least three isocyanate NCO functions, selected from the group consisting of biurets, of isocyanurates, of adducts of diisocyanates and triols, and of mixtures thereof; an —OH component comprising: at least two polyols P1 having a number-average molecular weight of strictly less than 500 g/mol and at least one polyol P2 having a number-average molecular weight of strictly greater than 1000 g/mol, said composition comprising at least one rheology agent.

16 Claims, No Drawings

POLYURETHANE-BASED COMPOSITION

CROSS-REFERENCE TO RELATED APPLICATIONS

This application is a U.S. National Stage application of International Patent Application No. PCT/FR2019/050768, filed on Apr. 3, 2019, which claims the benefit of French Patent Application No. 1852924, filed on Apr. 4, 2018.

FIELD OF THE INVENTION

The present invention relates to a polyurethane-based composition.

The invention also relates to the use of said composition in the repair and/or adhesive bonding of materials in the motor vehicle, marine and/or construction sector.

TECHNOLOGICAL BACKGROUND

Two-component polyurethane-based adhesive compositions are commonly used to obtain elevated mechanical performance qualities. These compositions may be in the form of two compositions (or components):
one (known as the —NCO component) containing the chemical species bearing isocyanate end groups, and
the other (known as the —OH component) containing the chemical species bearing hydroxyl end groups.

However, these polyurethane-based adhesive compositions generally have the drawback of using an —NCO component comprising high residual contents of diisocyanate monomers originating from the reaction for the synthesis of the polyurethane prepolymer bearing NCO groups (or bearing NCO end groups). This is because these residual diisocyanate monomers are capable of resulting in a number of undesirable effects. The term "diisocyanate monomer" refers to a hydrocarbon compound of low molar mass (less than 300 g/mol) bearing two isocyanate groups. In particular, the term "aromatic diisocyanate monomer" refers to a diisocyanate monomer as defined above, in which one of the NCO groups is connected via a covalent bond to a carbon atom forming part of an aromatic hydrocarbon-based ring, such as a phenyl group. In particular, the term "aliphatic diisocyanate monomer" refers to a nonaromatic diisocyanate monomer or a diisocyanate monomer in which none of the NCO groups is connected via a covalent bond to a carbon atom forming part of an aromatic hydrocarbon-based ring, such as a phenyl group.

The presence of high contents of residual monomers is dangerous for the handling and the health of the users, which implies restrictions of use and the implementation of ventilation systems. The installation of these systems is not always possible, for example in the context of the adhesive bonding or repair of motor vehicle parts (garage employees) or in construction. Moreover, in order to take into account the undesirable effects related to the presence of these diisocyanate monomers, regulations require, for some types of products, a specific labeling of the product, if the concentration of aromatic diisocyanate monomers exceeds 0.1% by weight relative to the weight of the product and/or if the concentration of aliphatic diisocyanate monomers exceeds 0.5% by weight, or even preferably 0.1% by weight, relative to the weight of the product.

It is thus desirable to make available to the public two-component adhesive compositions in which the —NCO component, based on polyurethane bearing NCO end groups, is substantially or even totally free of residual diisocyanate monomers and preferably in which the content of residual diisocyanate monomers is less than or equal to the abovementioned regulatory thresholds.

Adhesive compositions having low residual monomer contents are known in this field. However, these compositions have at least one of the following drawbacks: high viscosity, difficulty in extrusion, low reactivity, limited mechanical performance, creep after application, etc.

There is thus a need to provide novel polyurethane-based compositions which do not have at least one of the above-mentioned drawbacks.

DESCRIPTION OF THE INVENTION

In the present patent application, unless otherwise indicated:
the amounts expressed in the percentage form correspond to weight/weight percentages;
the number-average molecular masses (Mn), expressed in grams per mole (g/mol), are determined by calculation using the functionality (number of NCO or OH groups per mole) of the species under consideration (polyurethane polymer bearing NCO end groups, diol or polyol) and the analysis of the content of end groups (NCO or OH), expressed in % NCO, in mg KOH/g or in milliequivalents per gram (meq/g) depending on the nature of the species under consideration;
the hydroxyl number of a polyol (denoted OHN) represents the number of hydroxyl functions per gram of polyol and is expressed in the text of the present patent application in the form of the equivalent number of milligrams of potassium hydroxide (mg KOH/g) which are used in the assay of the hydroxyl functions. The OHN can be measured experimentally, for example according to the standard ISO 14900:2001. In the case of a mixture of polyols, the OHN can also be calculated from the known OHN values of each of the polyols and from their respective weight contents in said mixture;
the term "dissymmetric diisocyanate monomer" refers to a diisocyanate monomer whose isocyanate groups have different reactivities with regard to a given diol or polyol. As a general rule, such a monomer does not have an axis, plane or center of symmetry;
the content of diisocyanate monomer is measured according to the following analytical method, which is based on the specific reaction of the isocyanate NCO group with an amine (1-(2-methoxyphenyl)piperazine or PPZ) to form stable urea derivatives. These derivatives are obtained during the preparation of the adhesive sample by dilution/dissolution of this sample using a 0.02 mol/l solution of PPZ in acetonitrile. The PZZ derivatives formed from the isocyanates present in the sample to be analyzed are subsequently quantitatively determined by a reversed-phase C18 High Performance Liquid Chromatography (HPLC) system with a mobile phase gradient comprising a mixture of water and acetonitrile buffered using a 0.2% by weight aqueous tetrabutylammonium bisulfate solution, at a pH ranging from 4 to 5, equipped with an Ultra-Violet (UV) detector operating at 254 nm. These compounds are identified and quantified by comparing their retention times and the surface areas of their chromatographic peaks with those of the standard PPZ derivatives obtained by reaction of a diisocyanate monomer of known nature and concentration;
the viscosity is measured using a Brookfield viscometer according to the 1999 standard ISO 2555. Preferably, the measurement performed at 23° C. may be performed using a Brookfield RVT viscometer with a spindle suited to the viscosity range and at a rotational speed of 20 revolutions per minute (rev/min).

A. Composition

The present invention relates to a composition comprising:
an —NCO component comprising:
  A) at least one polyurethane including at least two NCO end groups obtained by a polyaddition reaction:
    of a composition comprising at least one diisocyanate, preferably at least one dissymmetric diisocyanate; and
    of a composition comprising at least one polyol;
  B) at least one polyisocyanate comprising at least three isocyanate —NCO functions chosen from the group consisting of biurets, isocyanurates, adducts of diisocyanates and of triols, and mixtures thereof;
an —OH component comprising:
  at least two polyols P1 each having a number-average molecular mass strictly less than 500 g/mol, said polyols P1 being such that:
    at least one polyol P1 comprises at least three hydroxyl functions, preferably at least four hydroxyl functions; and
    at least one polyol P1 comprises at least two hydroxyl functions; and
  at least one polyol P2 having a number-average molecular mass strictly greater than 1000 g/mol,
said composition comprising at least one rheological agent.

The polyisocyanates comprising at least three isocyanate functions B) may be chosen from monomeric polyisocyanates, oligomeric polyisocyanates, polymeric polyisocyanates, and mixtures thereof.

—OH Component

Polyol P1

The —OH component comprises at least two polyols P1 each having a number-average molecular mass strictly less than 500 g/mol.

According to one embodiment, the polyols P1 are chosen from polyester polyols, polyether polyols, polyene polyols, polycarbonate polyols, poly(ether-carbonate) polyols, and mixtures thereof. Preferably, the polyols P1 are chosen from polyether polyols.

Among the polyether polyols, examples that may be mentioned include polyoxypropylene (also referred to as polypropylene glycol (PPG), polyoxyethylene (also referred to as polyethylene glycol (PEG)), and mixtures thereof, the polyether polyols preferably being polyoxypropylenes.

The polyether polyols may comprise one or more arylene, preferably phenylene, radicals.

Preferably, the —OH component comprises:
at least one polyol P1 comprising at least three hydroxyl functions, preferably at least four hydroxyl functions; and
at least one polyol P1 comprising two hydroxyl functions, preferably comprising at least one arylene radical.

Even more preferably, the —OH component comprises:
at least one polyol P1 comprising at least four hydroxyl functions; and
at least one polyol P1 comprising two hydroxyl functions, preferably comprising at least one arylene radical.

According to one embodiment, the polyols P1 each have a number-average molecular mass ranging from 100 g/mol to less than 500 g/mol, preferably from 200 g/mol to less than 500 g/mol, preferentially from 300 to less than 500 g/mol, advantageously from 400 to less than 500 g/mol and even more advantageously from 400 to 490 g/mol.

Preferably, the polyols P1 each have a (mean) hydroxyl number (OHN) ranging from 224 to 2244 milligrams of KOH per gram of polyol (mg KOH/g), preferably from 224 to 1122 mg KOH/g, preferentially from 224 to 748 mg KOH/g, even more preferentially from 229 to 561 mg KOH/g.

Among the polyols P1, examples that may be mentioned include Dianol® 330 (propoxylated 4,4'-isopropylidenediphenol with an OHN of about 280 mg KOH/g) sold by CECA, or Lupranol® 3402 (propoxylated ethylenediamine with a functionality of 4 and an OHN of about 470 mg KOH/g) sold by BASF.

The —OH component according to the invention may comprise a total content of polyol(s) P1 of greater than or equal to 15% by weight, preferably from 15% to 80% by weight, preferentially from 20% to 70% by weight, advantageously from 25% to 60% by weight relative to the total weight of the —OH component.

Polyol P2

The —OH component comprises at least one polyol P2 with a number-average molecular mass strictly greater than 1000 g/mol, preferably less than or equal to 10 000 g/mol, preferentially less than or equal to 5000 g/mol, advantageously less than or equal to 3000 g/mol.

Preferably, the polyol P2 is chosen from diols, triols or mixtures thereof.

Preferably, the polyol P2 has a (mean) hydroxyl number (OHN) ranging from 11 to 168 milligrams of KOH per gram of polyol (mg KOH/g), preferably from 22 to 168 mg KOH/g, preferentially from 37 to 168 mg KOH/g.

The polyol(s) P2 that may be used may be chosen from polyester polyols, polyether polyols, polyene polyols, polycarbonate polyols, poly(ether-carbonate) polyols, and mixtures thereof.

The polyol(s) that may be used may be chosen from aromatic polyols, aliphatic polyols, arylaliphatic polyols, and mixtures of these compounds.

The polyester polyols may be chosen from polyester diols and polyester triols, and preferably from polyester diols.

Among the polyester polyols, examples that may be mentioned include:
polyester polyols of natural origin, such as castor oil;
polyester polyols resulting from the polycondensation:
  of one or more aliphatic (linear, branched or cyclic) or aromatic polyols, for instance monoethylene glycol, diethylene glycol, 1,2-propanediol, 1,3-propanediol, 1,4-butanediol, butenediol, 1,6-hexanediol, cyclohexanedimethanol, tricyclodecanedimethanol, neopentyl glycol, cyclohexanedimethanol, glycerol, trimethylolpropane, 1,2,6-hexanetriol, sucrose, glucose, sorbitol, pentaerythritol, mannitol, N-methyldiethanolamine, triethanolamine, a fatty alcohol dimer, a fatty alcohol trimer, and mixtures thereof, with
  one or more polycarboxylic acids or an ester or anhydride derivative thereof, such as 1,6-hexanedioic acid (adipic acid), dodecanedioic acid, azelaic acid, sebacic acid, adipic acid, 1,18-octadecanedioic acid, phthalic acid, isophthalic acid, terephthalic acid, succinic acid, a fatty acid dimer, a fatty acid trimer, and mixtures of these acids, an unsaturated anhydride, for instance maleic or phthalic anhydride, or a lactone, for instance caprolactone.

estolide polyols resulting from the polycondensation of one or more hydroxy acids, such as ricinoleic acid, with a diol (examples that may be mentioned include Polycin® D-1000 and Polycin® D-2000 available from Vertellus).

The abovementioned polyester polyols may be prepared conventionally and are for the most part commercially available.

Among the polyester polyols, examples that may be mentioned include the following products with a hydroxyl functionality equal to 2:

Tone® 0240 (sold by Union Carbide), which is a polycaprolactone with a number-average molecular mass of about 2000 g/mol and a melting point of about 50° C., Dynacoll® 7381 (sold by Evonik) with a number-average molecular mass of about 3500 g/mol and a melting point of about 65° C., Dynacoll® 7360 (sold by Evonik), which results from the condensation of adipic acid with hexanediol and has a number-average molecular mass of about 3500 g/mol and a melting point of about 55° C., Dynacoll® 7330 (sold by Evonik) with a number-average molecular mass of about 3500 g/mol and a melting point of about 85° C., Dynacoll® 7363 (sold by Evonik), which also results from the condensation of adipic acid with hexanediol and has a number-average molecular mass of about 5500 g/mol and a melting point of about 57° C., Dynacoll® 7250 (sold by Evonik): polyester polyol with a viscosity of 180 Pa·s at 23° C., a number-average molecular mass Mn equal to 5500 g/mol and a $T_g$ equal to −50° C., Kuraray® P-6010 (sold by Kuraray): polyester polyol with a viscosity of 68 Pa·s at 23° C., a number-average molecular mass Mn equal to 6000 g/mol and a $T_g$ equal to −64° C., Kuraray® P-10010 (sold by Kuraray): polyester polyol with a viscosity of 687 Pa·s at 23° C. and a number-average molecular mass Mn equal to 10 000 g/mol, Dekatol® 3008 (sold by the company Bostik) with a number-average molar mass Mn in the region of 1060 g/mol and the hydroxyl number of which ranges from 102 to 112 mg KOH/g. It is a product resulting from the condensation of adipic acid, diethylene glycol and monoethylene glycol.

The polyether polyol(s) that may be used according to the invention are preferably chosen from polyoxyalkylene polyols, the linear or branched alkylene portion of which comprises from 1 to 4 carbon atoms, more preferentially from 2 to 3 carbon atoms.

More preferentially, the polyether polyol(s) that may be used according to the invention are preferably chosen from polyoxyalkylene diols or polyoxyalkylene triols, the linear or branched alkylene portion of which comprises from 1 to 4 carbon atoms, more preferentially from 2 to 3 carbon atoms.

As examples of polyoxyalkylene diols or triols that may be used according to the invention, mention may be made of:

polyoxypropylene diols or triols (also denoted as polypropylene glycol (PPG) diols or triols) with a number-average molecular mass (Mn) ranging from more than 1000 g/mol to 12 000 g/mol;

polyoxyethylene diols or triols (also denoted as polyethylene glycol (PEG) diols or triols) with a number-average molecular mass (Mn) ranging from more than 1000 g/mol to 12 000 g/mol;

and mixtures thereof.

The abovementioned polyether polyols may be prepared conventionally and are widely available commercially. They may be obtained by polymerization of the corresponding alkylene oxide in the presence of a basic catalyst (for example potassium hydroxide) or a catalyst based on a double metal/cyanide complex.

As examples of polyether diols, mention may be made of the polyoxypropylene diol sold under the name Voranol® P 1010 by the company Dow, with a number-average molecular mass (Mn) in the region of 1020 g/mol and the hydroxyl number of which is about 110 mg KOH/g, or Voranol® P2000 sold by the company Dow, with a number-average molecular mass in the region of 2040 g/mol and the hydroxyl number of which is about 55 mg KOH/g.

The polyene polyol(s) that may be used according to the invention may preferably be chosen from polyenes including hydroxyl end groups, and the corresponding hydrogenated or epoxidized derivatives thereof.

Preferably, the polyene polyol(s) that may be used according to the invention are chosen from polybutadienes including hydroxyl end groups, which are optionally hydrogenated or epoxidized. Preferentially, the polyene polyol(s) that may be used according to the invention are chosen from butadiene homopolymers and copolymers including hydroxyl end groups, which are optionally hydrogenated or epoxidized.

In the context of the invention, and unless otherwise mentioned, the term "hydroxyl end groups" of a polyene polyol means the hydroxyl groups located at the ends of the main chain of the polyene polyol.

The hydrogenated derivatives mentioned above may be obtained by total or partial hydrogenation of the double bonds of a polydiene including hydroxyl end groups, and are thus saturated or unsaturated.

The epoxidized derivatives mentioned above may be obtained by chemoselective epoxidation of the double bonds of the main chain of a polyene including hydroxyl end groups, and thus include at least one epoxy group in its main chain.

Examples of polyene polyols that may be mentioned include saturated or unsaturated butadiene homopolymers comprising hydroxyl end groups, which are optionally epoxidized, for instance those sold under the name Poly BD® or Krasol® by the company Cray Valley.

The polycarbonate polyols may be chosen from polycarbonate diols or triols.

Examples of polycarbonate diols that may be mentioned include:

Converge® Polyol 212-20 sold by the company Novomer, with a number-average molecular mass ($M_n$) equal to 2000 g/mol, the hydroxyl number of which is 56 mg KOH/g, Polyol C1090, C-2090 and C-3090 sold by Kuraray, having a number-average molecular mass ($M_n$) ranging from 1000 to 3000 g/mol and a hydroxyl number ranging from 35 to 118 mg KOH/g.

Preferably, the polyol P2 is chosen from polyether polyols, and in particular from polyether diols.

The —OH component according to the invention may comprise a total content of polyol(s) P2 of greater than or equal to 5% by weight, preferably ranging from 5% to 50% by weight, preferentially from 5% to 40% by weight, advantageously from 10% to 30% by weight relative to the weight of the —OH component.

Other Polyols

The —OH component may comprise other polyol(s), for example chosen from the group consisting of:

polyether polyols with a number-average molecular mass of between 600 and 1000 g/mol, preferably polytetramethylene ether glycols (mention may be made, for example, of Terathane® 650 sold by the company Invista, with a functionality equal to 2 and an OHN of 173 mg KOH/g);

polyols with a number-average molecular mass ranging from 100 to 600 g/mol, preferably polyether diols (mention may be made, for example, of Voranol® P400L sold by the company Dow, which is a polypropylene glycol with a functionality equal to 2, a mean OHN of 260 mg KOH/g, and a number-average molecular mass in the region of 432 g/mol, or dipropylene glycol with a number-average molecular mass of about 134 g/mol); and mixtures thereof.

Additives

The —OH component may comprise at least one additive chosen from the group consisting of plasticizers, catalysts, solvents, pigments, adhesion promoters, moisture absorbers, UV stabilizers (or antioxidants), dyes, fillers, and mixtures thereof.

According to one embodiment, the —OH component comprises at least one catalyst. It may be any type of catalyst used in this field.

Preferably, the —OH component comprises at least one catalyst chosen from the group consisting of:

organometallic catalysts, preferably with the exception of tin-based catalysts;

tertiary amines; and mixtures thereof.

In the context of the invention, the term "organometallic catalysts, with the exception of tin-based catalysts" means organometallic catalysts not comprising tin.

It may concern a mixture of catalysts of the same family (for example a mixture of several tertiary amines or a mixture of several organometallic compounds comprising different metal atoms) or a mixture of catalysts of different families (for example a mixture of a tertiary amine and of an organometallic compound).

In the context of the invention, the term "organometallic catalysts" means catalysts comprising an organic radical and at least one metal.

In the context of the invention, the term "organic radical" means a radical comprising at least one carbon atom.

The organometallic compounds may comprise organometallic compounds (compounds comprising at least one metal-carbon covalent bond), metal alkoxides, metal carboxylates and metal coordination complexes with one or more organic ligands.

An example of an organic ligand that may be mentioned is acetylacetonate.

The metal atom of the organometallic compounds may be any metal atom known to those skilled in the art, preferably with the exception of tin, and may in particular be chosen from aluminum, manganese, silver, copper, gold, platinum, palladium, ruthenium, rhodium, molybdenum, zinc, cobalt, iron, nickel, bismuth, titanium or zirconium. Preferably, the metal atom of the organometallic compounds is chosen from aluminum, zinc, iron, bismuth, titanium, gold and zirconium.

The organometallic catalysts may comprise several metal atoms, for instance bismuth and zinc.

Preferably, the organometallic catalysts are catalysts based on bismuth and/or zinc.

In the context of the invention, the term "bismuth-based catalyst" means a catalyst comprising bismuth. Such a catalyst may thus comprise other metal atoms in addition to bismuth, for instance zinc.

In particular, the organometallic catalysts, and notably the bismuth-based catalysts, comprise exclusively bismuth as metal atom (bismuth catalysts).

The organometallic compounds (compounds comprising at least one metal-carbon covalent bond) may be carboxylates of organometallic compounds.

The metal alkoxides may be chosen from the group consisting of titanium tetrabutoxide, titanium tetraisopropoxide, zirconium tetrabutoxide, zirconium tetraisopropoxide, bismuth phenoxide and mixtures thereof.

The metal carboxylates may be those in which the carboxylic acid contains from 2 to 20 carbon atoms, preferably from 4 to 14 carbon atoms. Examples of carboxylic acids that may be mentioned include butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

The metal carboxylates may be monocarboxylates, dicarboxylates, tricarboxylates or mixtures thereof.

The metal carboxylates may be chosen from the group consisting of zinc-based carboxylates, bismuth-based carboxylates, bismuth/zinc-based carboxylates and mixtures thereof, the metal carboxylates being in particular chosen from the group consisting of zinc carboxylates, bismuth carboxylates, bismuth/zinc carboxylates and mixtures thereof.

Examples of bismuth carboxylates that may be mentioned include Borchi® KAT 320 (CAS number: 67874-71-9, bismuth 2-ethylhexanoate) and Borchi® KAT 315 (CAS number: 34364-26-6, bismuth neodecanoate), which are available from Borchers, KKAT XK-651, available from King Industries, KK KKAT XC-B221, available from King Industries, and Coscat 83 (bismuth neodecanoate, neodecanoic acid), available from Vertellus.

Examples of zinc carboxylates that may be mentioned include Borchi® KAT 0761 (CAS number: 27253-29-8, zinc neodecanoate), available from Borchers, or TIB KAT 616 (zinc neodecanoate), available from TIB Chemicals.

Examples of bismuth/zinc carboxylates that may be mentioned include TIB KAT 244 (bismuth/zinc 2-ethylhexanoate) from TIB Chemicals, or Borchi® KAT VP 0244 (mixture of zinc neodecanoate and of bismuth neodecanoate) from Borchers.

The catalyst is preferably chosen from metal carboxylates and more particularly zinc-based carboxylates, bismuth-based carboxylates, bismuth/zinc-based carboxylates, and mixtures thereof. In particular, the catalyst is chosen from bismuth 2-ethylhexanoate, zinc 2-ethylhexanoate, bismuth neodecanoate, zinc neodecanoate, bismuth/zinc 2-ethylhexanoate, bismuth/zinc neodecanoate, and mixtures thereof.

The metal coordination complexes with one or more organic ligands may be chosen from the group consisting of zinc acetylacetonate, titanium acetylacetonate (for example commercially available under the name Tyzor® AA75 from the company Dorf Ketal), titanium tetraacetylacetonate, aluminum trisacetylacetonate, aluminum chelates, for instance monoacetylacetonate bis(ethyl acetoacetate) (for example commercially available under the name K-KAT®

5218 from the company King Industries), zirconium tetraacetylacetonate, diisopropoxybis(ethylacetonato)titanium, and mixtures thereof.

Preferably, the tertiary amines are chosen from the group consisting of triethylamine, tributylamine, N,N-dimethylcyclohexylamine, dimethylbenzylamine, N,N'-dimethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1,3-diamine, N,N,N,N-tetramethylpropane-1,3-diamine, N,N,N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl)hexahydrotriazine, tetramethylguanidine, 1,8-diazabicyclo[5.4.0]undec-7-ene (DBU), 1,4-diazabicyclo[2.2.2]octane (DABCO), 1,5-diazabicyclo[4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol, and mixtures thereof.

In particular, the tertiary amines are chosen from 1,8-diazabicyclo[5.4.0]undec-7-ene (DBU), 1,5-diazabicyclo[4.3.0]non-5-ene (DBN), 2,2'-dimorpholinodiethyl ether (DMDEE), 1,4-diazabicyclo[2.2.2]octane (DABCO), and mixtures thereof.

According to a preferred embodiment, the —OH component comprises:
- a catalyst chosen from organometallic catalysts, in particular from organometallic catalysts based on bismuth and/or zinc, for instance zinc-based carboxylates, bismuth-based carboxylates, bismuth/zinc-based carboxylates or mixtures thereof and advantageously from zinc carboxylates, bismuth carboxylates, bismuth/zinc carboxylates, and mixtures thereof, and
- optionally, a catalyst chosen from tertiary amines, in particular 1,4-diazabicyclo[2.2.2]octane (DABCO).

The —OH component may comprise a total amount of catalyst(s) ranging from 0.05% to 15% by weight, preferentially from 0.1% to 10% by weight, advantageously from 0.1% to 5% by weight, relative to the total weight of the —OH component.

According to one embodiment, the —OH component comprises at least one filler chosen from mineral fillers, organic fillers, and mixtures thereof.

As examples of mineral filler(s) that may be used, use may be made of any mineral filler(s) usually used in the field of adhesive compositions. These fillers are typically in the form of particles of diverse geometry. They may be, for example, spherical or fibrous or may have an irregular shape.

Preferably, the filler(s) are chosen from the group consisting of clay, quartz, carbonate fillers, kaolin, gypsum, clays and mixtures thereof; preferentially, the filler(s) are chosen from carbonate fillers, such as alkali metal or alkaline-earth metal carbonates, and more preferentially calcium carbonate or chalk.

These fillers may be untreated or treated, for example using an organic acid, such as stearic acid, or a mixture of organic acids predominantly consisting of stearic acid.

Use may also be made of hollow mineral microspheres, such as hollow glass microspheres, and more particularly those made of calcium sodium borosilicate or of alum inosilicate.

As examples of organic filler(s) that may be used, use may be made of any organic filler(s) and in particular any polymeric filler(s) generally used in the field of adhesive compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may notably be made of hollow microspheres made of vinylidene chloride/acrylonitrile.

The mean particle size of the filler(s) that may be used is preferably less than or equal to 100 microns, preferentially less than or equal to 30 microns, advantageously less than or equal to 10 microns.

The mean particle size is measured for a volume particle size distribution corresponding to 50% by volume of the sample of particles analyzed. When the particles are spherical, the mean particle size corresponds to the median diameter (D50 or Dv50), which corresponds to the diameter such that 50% of the particles by volume have a size which is smaller than said diameter. In the present patent application, this value is expressed in micrometers and determined according to the standard NF ISO 13320-1 (1999) by laser diffraction on an appliance of Malvern type.

The —OH component may comprise a total amount of filler(s) ranging from 1% to 50% by weight, preferentially from 10% to 45% by weight, advantageously from 20% to 40% by weight, relative to the total weight of the —OH component.

Preferably, the —OH component has a mean OHN ranging from 150 to 170 mg KOH/g and preferentially from 155 to 165 mg KOH/g.

—NCO Component

The composition according to the invention comprises an —NCO component comprising:
- A) at least one polyurethane including at least two NCO end groups obtained by a polyaddition reaction:
  - of a composition comprising at least one diisocyanate, said diisocyanate preferably being dissymmetric; and
  - of a composition comprising at least one polyol;
- B) at least one polyisocyanate comprising at least three isocyanate —NCO functions, preferably at least four isocyanate —NCO functions.

A) Polyurethane Bearing NCO End Groups

The —NCO component may comprise a total content of polyurethane(s) including at least two abovementioned NCO end groups ranging from 15% to 95% by weight of the —NCO component, preferably from 20% to 90% by weight, preferentially from 35% to 85% by weight and even more advantageously from 35% to 60% by weight relative to the total weight of the —NCO component.

According to one embodiment, the diisocyanate monomer(s) are chosen from the group consisting of:
- isophorone diisocyanate (IPDI),
- toluene diisocyanate (TDI), and in particular 2,4-toluene diisocyanate;
- the hydrogenated form of TDI, and in particular the hydrogenated form of 2,4-toluene diisocyanate and/or the hydrogenated form of 2,6-TDI:

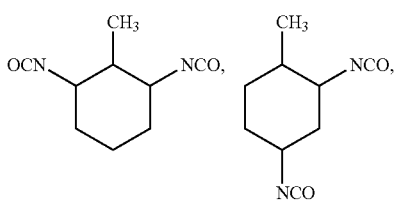

diphenylmethane diisocyanate (MDI), and in particular 2,4'-diphenylmethane diisocyanate (2,4'-MDI) and/or 4,4'-MDI;

the hydrogenated form of MDI, and in particular the hydrogenated form of 2,4'-diphenylmethane diisocyanate (2,4'-MDI); and mixtures thereof.

In particular, it (they) may be used in the form of a composition of diisocyanates comprising at least 90% by weight and preferably at least 95% by weight, relative to the weight of said composition, of a diisocyanate monomer, preferably of a dissymmetric diisocyanate monomer.

More preferentially, the dissymmetric diisocyanate monomer(s) are chosen from the 2,4'-MDI isomer, the 2,4-TDI isomer, a mixture of MDI isomers containing at least 90% by weight and preferably containing at least 95% by weight of 2,4'-MDI isomer, or a mixture of TDI isomers containing at least 90% by weight and preferably containing at least 95% by weight of 2,4-TDI isomer, said percentages being expressed respectively relative to the weight of the mixture of isomers.

The diisocyanate monomer(s) that may be used to prepare the abovementioned polyurethane comprising at least two NCO groups A) are typically commercially available. An example that may be mentioned is Scuranate® T100 sold by the company Vencorex and corresponding to a mixture of TDI isomers comprising at least 99% by weight of 2,4-TDI isomer, and of which the percentage of NCO is 48.1%.

The composition comprising said at least one diisocyanate may also comprise at least one triisocyanate chosen, for example, from isocyanurates, biurets, adducts of diisocyanate and of triols, and mixtures thereof.

Preferably, the composition consists of said at least one diisocyanate. In this case, the composition therefore cannot comprise triisocyanate.

The polyol(s) that may be used to prepare the abovementioned polyurethane A) are preferably chosen from polyether polyols (preferably polyether diols), polyester polyols, and mixtures thereof.

The mixtures of polyether polyol(s) and of polyester polyol(s) may be:
a mixture of polyether polyols of different natures with a polyester polyol;
a mixture of polyether polyols of different natures with a mixture of polyester polyols of different natures; or
a mixture of a polyether polyol with a mixture of polyester polyols of different natures.

Preferably, the polyurethane A) is prepared from a mixture of at least one polyether polyol, preferably polyether diol, and of at least one polyester polyol, preferably polyester diol.

The polyol(s) that may be used to prepare the abovementioned polyurethane A) may be chosen from those whose number-average molecular mass Mn is less than or equal to 5000 g/mol, preferably less than or equal to 4000 g/mol, advantageously strictly less than 2000 g/mol, and more preferentially those whose number-average molecular mass Mn ranges from 400 to 1500 g/mol.

Preferably, the polyol(s) that may be used to prepare the abovementioned polyurethane A) have a hydroxyl number (OHN) ranging from 28 to 281 mg KOH/g, preferably from 100 to 281 mg KOH/g.

The polyether polyol(s) that may be used to prepare the abovementioned polyurethane A) are preferably chosen from polyoxyalkylene polyols (preferably polyoxyalkylene diols), the (saturated) linear or branched alkylene part of which comprises from 2 to 4 carbon atoms and preferably from 2 to 3 carbon atoms.

Preferably, the polyether polyol(s) that may be used to prepare the abovementioned polyurethane A) are chosen from polyoxypropylene polyols with a polydispersity index ranging from 1 to 1.4, in particular ranging from 1 to 1.3. This index corresponds to the ratio of the weight-average molecular mass Mw to the number-average molecular mass Mn of the polyether polyol (PI=Mw/Mn), determined by GPC.

Preferably, the polyether polyol(s) that may be used to prepare the polyurethane A) have an OHN ranging from 50 to 281 mg KOH/g.

The abovementioned polyether polyol(s) may be prepared in a conventional manner and/or are typically available commercially, as illustrated in the examples.

The polyester polyol(s), preferably polyester diols, that may be used to prepare the abovementioned polyurethane A) may be chosen from:
polyester polyols resulting from the polycondensation of at least one dicarboxylic acid, or of at least one of its corresponding anhydrides or diesters, with at least one diol,
polyester polyols resulting from a polymerization with ring opening of at least one cyclic lactone with at least one diol, such as polycaprolactone polyols.

The dicarboxylic acid(s) that may be used for the synthesis of the abovementioned polyester polyols may be linear or branched, cyclic or acyclic, saturated or unsaturated and aromatic or aliphatic and preferably comprise from 3 to 40 carbon atoms and more preferentially from 5 to 10 carbon atoms. Said acid may be, for example, adipic acid, phthalic acid, succinic acid or mixtures thereof.

The diol(s) that may be used for the synthesis of the abovementioned polyester polyols may be chosen from polyalkylene diols, polyoxyalkylene diols and mixtures of these compounds, the alkylene (saturated) part of these compounds preferably being linear or branched and preferably comprising from 2 to 40 carbon atoms and more preferentially from 2 to 8 carbon atoms. Said diol may be, for example, monoethylene glycol, diethylene glycol, 1,2-propanediol, 1,3-propanediol, 1,4-butanediol, 1,6-hexanediol, or mixtures thereof.

The cyclic lactone(s) that may be used for the synthesis of the abovementioned polyester polyols preferably comprise from 3 to 7 carbon atoms.

Preferably, the polyester polyol(s) that may be used to prepare the abovementioned polyurethane A) have an OHN ranging from 90 to 281 mg KOH/g, preferentially from 90 to 280 mg KOH/g and advantageously from 90 to 150 mg KOH/g.

The polyester polyol(s) that may be used to prepare the abovementioned polyurethane A) may be prepared in a conventional manner and/or are typically available commercially, as illustrated in the examples.

According to one embodiment, the abovementioned polyurethane A) is obtained from:
- a mixture of polyoxyalkylene polyols, the (saturated) linear or branched alkylene part of which comprises from 2 to 4 carbon atoms and preferably from 2 to 3 carbon atoms, said polyoxyalkylene polyols preferably each having an OHN ranging from 50 to 281 mg KOH/g;
- a mixture of:
  polyester polyol(s) as defined above and having in particular an OHN ranging from 90 to 281 mg KOH/g, preferably from 200 to 281 mg KOH/g; and
  polyoxyalkylene diol(s), the (saturated) linear or branched alkylene part of which comprises from 2 to 4 carbon atoms and preferably from 2 to 3 carbon atoms, said polyoxyalkylene diol(s) preferably having an OHN ranging from 50 to 281 mg KOH/g, preferably from 90 to 150 mg KOH/g.

Preferably, the amounts of isocyanate monomer(s) and of polyol(s) used in the synthesis of the abovementioned polyurethane A) are such that the NCO/OH mole ratio, denoted $r_1$, ranges from 1.5 to 2.0, more preferentially from 1.7 to 1.9.

This ratio $r_1$ corresponds to the ratio of the number of —NCO groups (present in the total amount of isocyanate monomer(s) used to synthesize the polyurethane bearing NCO end groups A)) to the number of —OH groups (present in the total amount of polyol(s) used to synthesize the polyurethane bearing NCO end groups A)).

The weight amounts of isocyanate monomer(s) and of polyol(s) to be charged to the reactor are notably determined on the basis of this ratio and also the hydroxyl number OHN of the polyol or of the mixture of polyols, measured experimentally or calculated from the OHN values of the polyols present and from their respective weight contents in said mixture.

The polyurethane A) as defined above may be prepared in the presence or absence of at least one reaction catalyst, preferentially at a reaction temperature T1 of less than 95° C. and preferably ranging from 65° C. to 80° C., and preferably under anhydrous conditions.

The set of conditions described above for obtaining the polyurethane A) advantageously makes it possible to obtain a concentration of unreacted isocyanate monomer(s) which is low enough at the end of the reaction for the polyurethane A) to be able to be used directly after its synthesis in the preparation of the —NCO component, without it being necessary to treat it, for example by purification, distillation or selective extraction processes as employed in the prior art, in order to remove or reduce the excess of unreacted isocyanate monomer(s) present in the reaction product.

The —NCO component obtained may thus comprise a content of aliphatic isocyanate (preferably diisocyanate) monomer(s) of less than or equal to 0.5% by weight relative to the weight of the —NCO component, and a content of aromatic isocyanate (preferably diisocyanate) monomer(s) of less than or equal to 0.1% by weight relative to the weight of the —NCO component.

B) Polyisocyanate Comprising at Least Three Isocyanate —NCO Functions

The —NCO component may comprise a total content of polyisocyanate(s) comprising at least three —NCO functions B) ranging from 40% to 95% by weight, preferably from 45% to 90% by weight, preferentially from 50% to 85% by weight and advantageously from 45% to 65% by weight relative to the total weight of the —NCO component.

The —NCO component comprises at least one polyisocyanate comprising at least three isocyanate —NCO functions, said polyisocyanate being chosen from the group consisting of biurets, isocyanurates, adducts of diisocyanates and of triols, and mixtures thereof, preferably chosen from biurets.

The polyisocyanates comprising at least three isocyanate functions B) may be chosen from monomeric polyisocyanates, oligomeric polyisocyanates, polymeric polyisocyanates, and mixtures thereof.

The oligomeric polyisocyanates are typically mixtures of polyisocyanates having different degrees of oligomerization.

For example, the biurets may be mixtures of monomeric, oligomeric and/or polymeric biurets. In particular, the biurets are mixtures comprising biuret triisocyanates (monomeric), oligomeric biurets and optionally polymeric biurets.

In particular, the isocyanurate(s) may be used in the form of an industrial mixture of (poly)isocyanurate(s) with a purity of greater than or equal to 70% by weight of isocyanurate(s), relative to the weight of said mixture.

Preferably, the diisocyanate isocyanurate(s) that may be used according to the invention correspond to the general formula (I) below:

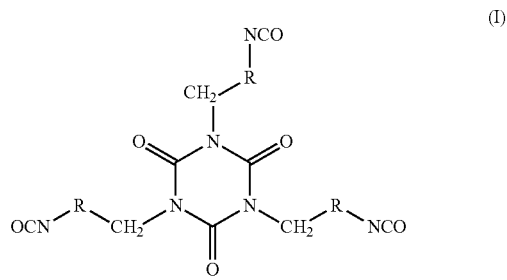

(I)

in which:
R represents a linear, branched or cyclic, aliphatic or aromatic alkylene group comprising from 4 to 9 carbon atoms,
with the proviso that the NCO groups are not connected via a covalent bond to a carbon atom forming part of an aromatic hydrocarbon-based ring, such as a phenyl group.

As examples of diisocyanate isocyanurate(s) that may be used according to the invention, mention may be made of:
hexamethylene diisocyanate isocyanurate (HDI) having the following formula:

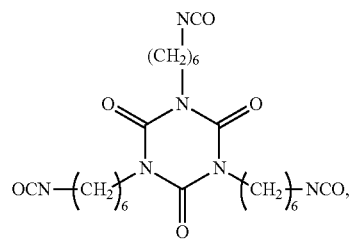

isophorone diisocyanate isocyanurate (IPDI) having the following formula:

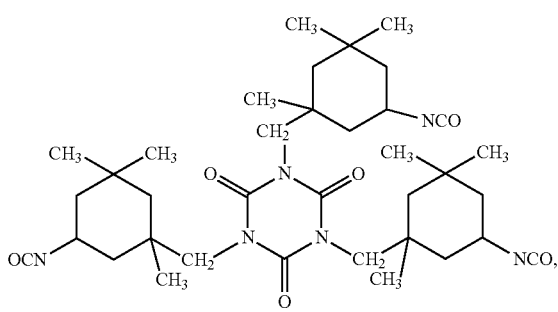

pentamethylene diisocyanate isocyanurate (PDI) having the following formula:

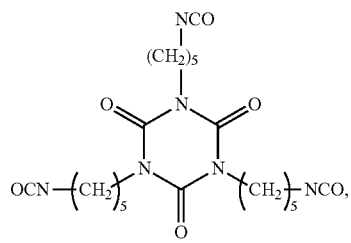

meta-xylene diisocyanate isocyanurate (m-XDI) having the following formula:

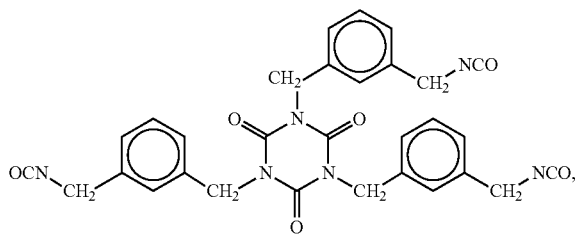

m-XDI isocyanurate in hydrogenated form having the following formula:

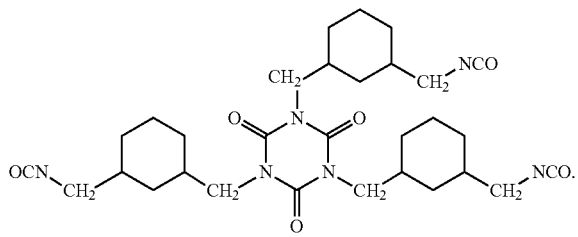

The diisocyanate(s) that may be used to prepare the adducts of diisocyanate and triol are preferably chosen from aromatic or aliphatic diisocyanate monomers and mixtures thereof, and more preferentially aliphatic diisocyanate monomers. The diisocyanate monomer(s) may be in the form of a pure isomer or in the form of a mixture of isomers.

As triols that may be used to prepare the adducts of diisocyanate and triol, examples that may be mentioned include glycerol, trimethylolmethane (TMM), trimethylolethane (TME) and trimethylolpropane (TMP). Preferably, TMP is used.

As examples of adducts of diisocyanates and of triols that may be used according to the invention, mention may be made of the adduct of meta-xylene diisocyanate and of trimethylolpropane, as represented below.

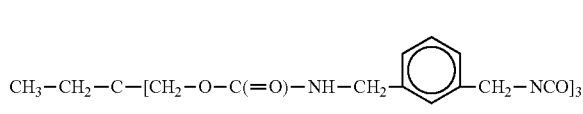

Preferably, the biurets(s) that may be used according to the invention are one (or more) monomeric, oligomeric or polymeric biuret(s) of hexamethylene diisocyanate (HDI), of isophorone diisocyanate (IPDI), of pentamethylene diisocyanate (PDI), of meta-xylylene diisocyanate (m-XDI) or of hydrogenated meta-xylylene diisocyanate (m-HXDI).

According to one embodiment, the —NCO component comprises B) a mixture of polyisocyanates, said polyisocyanates each comprising at least three NCO functions, the mean NCO functionality of said mixture of polyisocyanates being greater than or equal to 3, preferably greater than or equal to 3.2, even more preferentially greater than or equal to 3.5.

The term "mean NCO functionality of a mixture" means the mean number of NCO functions per mole of mixture.

Among the polyisocyanates B) according to the invention, examples that may be mentioned include:
- the HDI biurets sold, for example, by Bayer under the names Desmodur® N100 and N3200, or those sold by Vencorex under the names Tolonate® HDB and HDB-LV,
- the HDI isocyanurates sold, for example, by Bayer under the names Desmodur® N3300, N3600 and N3790BA, or those sold by Vencorex under the names Tolonate® HDT, HDT-LV and HDT-LV2.

According to one embodiment, the mole ratio of the number of NCO groups present in the total amount of diisocyanate monomer(s) used for the synthesis of the polyurethane bearing NCO end groups A) to the number of NCO groups present in the total amount of polyisocyanate(s) B) present in the —NCO component, denoted $r_2$, preferably ranges from 3 to 8.5, more preferentially from 3 to 7, even more preferably from 3 to 5 and better still from 3 to 4.

The —NCO component may comprise a mass content of NCO groups ranging from 14% to 20%, preferably from 15% to 18%, by mass relative to the total mass of said —NCO component.

The —NCO component may be prepared by simple mixing of its ingredients at a temperature of less than or equal to 85° C. and preferably ranging from 60° C. to 80° C., preferentially under anhydrous conditions.

According to a preferred embodiment, the —NCO component according to the invention comprises:
- from 15% to 80% by weight, preferably from 30% to 70% by weight, of polyurethane(s) A) as defined above; and
- from 30% to 80% by weight, preferably from 40% to 70% by weight, of polyisocyanate(s) comprising at least three isocyanate —NCO functions B) as defined above.

Additives

The —NCO component may comprise at least one additive chosen from the group consisting of plasticizers, catalysts, solvents, pigments, adhesion promoters, moisture absorbers, UV stabilizers (or antioxidants), dyes, fillers, and mixtures thereof.

The total content of the abovementioned additive(s) in the —NCO component may range from 0% to 35% by weight, preferably from 0% to 20% by weight, advantageously from 0% to 15% by weight and even more advantageously from 0% to 10% by weight relative to the total weight of said —NCO component.

Preferably, the —NCO component does not comprise a solvent, it being possible for said solvent to be an organic solvent, such as ethyl acetate, methyl ethyl ketone, tetrahydrofuran, methyltetrahydrofuran, or else from Isane® (based on isoparaffins, available from the company Total) or Exxol® D80 (based on aliphatic hydrocarbons, available from the company ExxonMobil Chemical) or else chlorobenzene, naphtha, acetone, n-heptane or xylene.

According to one embodiment, the —NCO component has a viscosity, measured at room temperature (23° C.), ranging from 15 000 to 70 000 mPa·s, preferably ranging from 20 000 to 50 000 mPa·s.

Preferably, the abovementioned —NCO component comprises:
A) at least one polyurethane including at least two NCO end groups obtained by a polyaddition reaction:
of a composition comprising at least one dissymmetrical diisocyanate, preferably toluene diisocyanate (TDI) (in the form of a single isomer or a mixture of isomers);
of a composition comprising at least one polyether diol and one polyester diol as defined previously;
B) at least one polyisocyanate comprising at least three isocyanate —NCO functions chosen from isocyanurates, biurets, and mixtures thereof;
the total amount of the abovementioned polyurethane(s) A) ranging from 30% to 95% by weight of the —NCO component, preferably from 35% to 60% by weight, relative to the total weight of the —NCO component; and
the total amount of the abovementioned polyisocyanate B) ranging from 40% to 95% by weight, preferably from 50% to 85% by weight, relative to the total weight of the —NCO component.

Composition

Preferably, the composition according to the invention is an adhesive composition.

The composition according to the invention comprises at least one rheological agent, preferably included in the abovementioned —OH component.

Preferably, the composition according to the invention is such that the —OH component comprises at least one rheological agent, and the —NCO component comprises at least one rheological agent which may be identical to or different from that of the —OH component.

As examples of rheological agent(s) that may be used, mention may be made of any rheological agent customarily used in the field of adhesive compositions.

Preferably, the composition comprises at least one rheological agent chosen from thixotropic agents, and more preferentially from:
PVC plastisols, corresponding notably to a suspension of PVC in a plasticizer that is miscible with PVC, obtained in situ by heating to temperatures ranging from 60° C. to 80° C. These plastisols may be those described notably in the publication Polyurethane Sealants, Robert M. Evans, ISBN 087762-998-6,
fumed silica,
urea derivatives derived from the reaction of an aromatic diisocyanate monomer such as 4,4'-MDI with an aliphatic amine such as butylamine. The preparation of such urea derivatives is described notably in patent application FR 1 591 172;
amide waxes, preferably micronized amide waxes, such as Crayvallac® SLT sold by Arkema.

The amide waxes are preferably castor oil derivatives.

According to one embodiment, the amide waxes are in the form of particles the diameter d10 of which, which corresponds to the diameter such that 10% by volume of the particles have a size less than said diameter, is greater than or equal to 1 μm, and/or the diameter d90 of which (corresponding to the diameter such that 90% by volume of the particles have a size less than said diameter) is less than or equal to 20 μm. In the present patent application, this value is expressed in micrometers and is determined according to the standard NF ISO 13320-1 (1999) by laser scattering on a machine of Malvern type.

The amine waxes preferably have an amine number ranging from 1 to 10 mg KOH/g, preferably ranging from 2 to 5 mg KOH/g, and a hydroxyl number ranging from 100 to 120 mg KOH/g.

The amine number represents the number of amine functions per gram of product and is expressed in the form of the equivalent number of milligrams of potassium hydroxide (KOH) used in the assay of the amine functions per gram of product. This number may be measured experimentally by potentiometry.

Preferably, the rheological agent does not contain any silica, and in particular the rheological agent is not fumed silica.

The total content of rheological agent(s) that may be used may range from 0.1% to 10% by weight, preferably from 0.1% to 5% by weight, more preferentially from 0.5% to 3% by weight and advantageously from 1% to 3% by weight relative to the total weight of the composition according to the invention.

The total content of rheological agent(s) that may be used in the —OH component may range from 0% to 10% by weight, preferably from 0.1% to 10% by weight, more preferentially from 1% to 5% by weight relative to the total weight of the —OH component.

The total content of rheological agent(s) that may be used in the —NCO component may range from 0% to 10% by weight, preferably from 0.1% to 10% by weight, more preferentially from 1% to 5% by weight, relative to the total weight of the —NCO component.

Preferably, the composition according to the invention comprises amide wax, and preferably micronized amide wax as rheological agent, in a total content in the composition ranging from 0.1% to 10%, preferably from 1% to 5% and advantageously from 1% to 3% by weight, relative to the total weight of said composition.

According to one embodiment, the composition according to the invention comprises at least one catalyst.

Preferably, the total content of catalyst(s) in the composition ranges from 0.01% to 10% by weight, preferably from 0.1% to 5% by weight, advantageously from 0.50% to 2.5% by weight relative to the total weight of said composition.

According to one embodiment of the invention, the volume ratio of —OH component/—NCO component in the composition ranges from ⅓ to 3/1, preferably from ½ to 2/1, said volume ratio advantageously being equal to 1/1.

According to one embodiment, the composition according to the invention comprises:
an —NCO component comprising:
A) at least one polyurethane including at least two NCO end groups obtained by a polyaddition reaction:

of a composition comprising at least one diisocyanate, preferably at least one dissymmetric diisocyanate; and
of a composition comprising at least one polyol;
B) a mixture of polyisocyanates, said polyisocyanates each comprising at least three isocyanate —NCO functions and each being chosen from the group consisting of biurets, isocyanurates, adducts of diisocyanates and of triols, and mixtures thereof, in particular chosen from biurets;
an —OH component comprising:
at least two different polyols P1 each having a number-average molecular mass strictly less than 500 g/mol, said polyols P1 being such that:
at least one polyol P1 comprises at least four hydroxyl functions; and
at least one polyol P1 comprises two hydroxyl functions; and
at least one polyol P2 having a number-average molecular mass strictly greater than 1000 g/mol,
said composition comprising at least one rheological agent.

The composition according to the invention advantageously has at least one of the following properties:
readily extrudable, notably when the composition is used in a gun for application as beads;
reduced or even zero content of residual diisocyanate monomers, and thus advantageously nontoxic and nonhazardous;
reduction or even absence of creep (or of running) of the mixture which has not yet been crosslinked, notably during application in the vertical position;
very rapid increase in cohesion advantageously making it possible to handle and/or sand down and/or cut the assemblies obtained rapidly after application of the composition according to the invention;
leads, after crosslinking, to an adhesive seal having:
high adhesive properties, advantageously without the use of a primer, and/or
high mechanical properties.

The composition according to the invention advantageously leads to an adhesive seal having:
a tensile modulus of greater than or equal to 10 MPa, preferably greater than or equal to 12 MPa, preferentially greater than or equal to 15 MPa and even more preferentially greater than or equal to 20 MPa; and/or
an elongation at break of greater than or equal to 5%, preferably greater than or equal to 10%, preferentially greater than or equal to 15%, advantageously greater than or equal to 20% and even more advantageously greater than or equal to 40%; and/or
a Shore A hardness strictly greater than 80; and/or
a Shore D hardness strictly greater than 40; and/or
a pot life of less than 5 minutes, preferably less than or equal to 2 minutes.

B. Ready-to-Use Kit

The present invention also relates to a ready-to-use kit, comprising the OH component as defined above, on the one hand, and the NCO component as defined above, on the other hand, packaged in two separate compartments.

Specifically, the composition according to the invention may be in a two-component form, for example in a ready-to-use kit, comprising the OH component, on the one hand, in a first compartment or drum and the NCO component, on the other hand, in a second compartment or drum, in proportions suitable for direct mixing of the two components, for example by means of a metering pump.

According to one embodiment of the invention, the kit also comprises one or more means for mixing the two components OH and NCO. Preferably, the mixing means are chosen from metering pumps and static mixers with a diameter suited to the amounts used.

C. Uses

The present invention also relates to the use of a composition as defined above as adhesive, mastic or coating, preferably as adhesive.

The composition may in particular serve for repairing and/or adhesive bonding in the motor vehicle, construction or marine sector.

In the motor vehicle sector, it may be a case of repairing damaged plastic parts or bumpers (scratches).

The present invention also relates to a process for assembling two substrates by adhesive bonding, comprising:
the coating onto at least one of the two substrates to be assembled of an adhesive composition obtained by mixing the —OH and —NCO components as defined previously; and then
actually bringing the two substrates into contact.

The appropriate substrates are, for example, inorganic substrates, such as concrete, metals or alloys (such as aluminum alloys, steel, non-ferrous metals and galvanized metals); or else organic substrates, such as wood, plastics, such as PVC, polycarbonate, PMMA, polyethylene, polypropylene, polyesters or epoxy resins; substrates made of metal and composites coated with paint (as in the motor vehicle sector for example).

All the embodiments described above may be combined with each other. In particular, the various abovementioned constituents of the composition, and notably the preferred embodiments of the composition, may be combined with each other.

In the context of the invention, the term "between x and y" or "ranging from x to y" means a range in which the limits x and y are included. For example, the range "between 0% and 25%" notably includes the values 0% and 25%.

The invention is now described in the following implementation examples which are given purely by way of illustration and should not be interpreted in order to limit the scope thereof.

EXAMPLES

The following ingredients were used:
Voranol™ P1010 sold by the company Dow is a polypropylene glycol (PPG) of functionality F=2 having an OHN of 110 mg KOH/g, i.e. a number-average molecular mass (Mn) in the region of 1020 g/mol.
Voranol™ P2000 sold by the company Dow is a polypropylene glycol (PPG) of functionality F=2 having an OHN of 55 mg KOH/g, i.e. a number-average molecular mass (Mn) in the region of 2040 g/mol.
Dianol® 330 sold by the company CECA is propoxylated (PPG) 4,4'-isopropylidenediphenol of functionality F=2 having an OHN of 280 mg KOH/g, i.e. a number-average molecular mass (Mn) in the region of 401 g/mol.
Lupranol® 3402 sold by the company BASF is a propoxylated ethylenediamine of functionality F=4 having an OHN of 470 mg KOH/g, i.e. a number-average molecular mass (Mn) in the region of 480 g/mol.
Terathane® 650 sold by the company Invista is a polytetrahydrofuran of functionality F=2 having an OHN of 173 mg KOH/g, i.e. a number-average molecular mass (Mn) in the region of 650 g/mol.

Siliporite® SA 1720 sold by the company CECA is a 3A molecular sieve.

Borchi® KAT VP 0244 sold by the company Borchers is a mixture of bismuth neodecanoate and zinc neodecanoate used as catalyst.

Borchi® KAT 315 sold by the company Borchers: bismuth neodecanoate used as catalyst.

Dabco® 33-LV sold by the company Evonik is a solution of 1,4-diazabicyclo[2.2.2]octane (or triethylenediamine) in dipropylene glycol.

Cravallac® SLT sold by the company Arkema is a micronized bio-sourced hydroxylated polyamide wax (d10 min=1.6 μm and d90 max=15.5 μm measured with a Malvern Mastersizer S laser according to the standard ISO 13320), having an amine number of 3.3 mg KOH/g, a hydroxyl number of 110.7 mg KOH/g and an activation temperature between 30 and 80° C., used as rheological agent.

Tolonate™ HDB-LV sold by the company Vencorex is an HDI-based polyisocyanate of biuret type with a mean functionality F=3.7 having an NCO percentage ranging from 22.5% to 24.5% and a residual HDI content <0.1%, and having a viscosity at 25° C. ranging from 1500 to 2500 mPa·s.

Scuranate® T100 sold by the company Vencorex and corresponding to a mixture of TDI isomers comprising at least 99% by weight of 2,4-TDI isomer. Its NCO percentage is 48.1%.

Voranol® P400L sold by the company Dow is a polypropylene glycol of functionality F=2 with a mean hydroxyl number of 260 mg KOH/g, i.e. a number-average molecular mass (Mn) in the region of 432 g/mol.

Dekatol® 3008 manufactured by the company Bostik is a polyester polyol of functionality equal to 2, with a number-average molar mass Mn in the region of 1060 g/mol and the hydroxyl number of which ranges from 102 to 112 mg KOH/g. It is a product resulting from the condensation of adipic acid, diethylene glycol and monoethylene glycol.

Aerosil® R202 sold by the company Evonik is a hydrophobic fumed silica with a specific surface area (BET) in the region of 100 m²/g.

Omya® BL 200 sold by the company Omya is a chalk (calcium carbonate) with a particle size in the region of 9 μm.

Example 1

Preparation of the —NCO Component

1.A. Preparation of the Polyurethane (PU) Bearing NCO End Groups:

The polyurethane PU bearing NCO end groups used in the following examples was prepared using the various ingredients given in table 1. The amounts of diisocyanate(s) and of polyol(s) used (expressed as weight percentages of commercial product relative to the weight of —NCO component) correspond to an NCO/OH mole ratio (r1) of about 1.75, as shown in table 1.

The diisocyanate(s) and the polyol(s) are mixed in a reactor kept under constant stirring and under nitrogen, at a temperature T1 ranging from 65° C. to 80° C. The temperature is controlled so as not to exceed 82° C.

The whole is kept mixing at this temperature until the hydroxyl functions of the polyols have been completely consumed.

The degree of progress of the reaction is monitored by measuring the content of NCO group by back titration of dicyclohexylamine using hydrochloric acid, according to the internal method of assay of the free NCOs. The reaction is halted when the content of NCO group measured is approximately equal to the content of NCO group desired.

1.B. Preparation of the —NCO Component by Mixing its Ingredients:

The polyurethane bearing NCO end groups obtained is then mixed with the other ingredients constituting the —NCO component, in the proportions indicated in table 1 (expressed as weight percentages of commercial product relative to the total weight of —NCO component), in the same reactor maintained under constant stirring and under nitrogen.

After homogenization of the mixture (30 to 120 minutes), the content of NCO group and the weight content of diisocyanate monomer in the —NCO component are respectively measured.

The content of NCO group in the —NCO component, expressed as weight percentage relative to the weight of the —NCO component (% NCO), is measured according to the standard NF T52-132.

The weight content of diisocyanate monomer is measured by an HPLC method provided with a UV detector, as described previously (reversed-phase C18, mobile phase: aqueous acetonitrile solution, buffered with a 0.2% by weight aqueous tetrabutylammonium bisulfate solution at pH equal to 4.5, detection wavelength: 254 nm).

For all of the examples, the weight content of diisocyanate monomer present in the —NCO component is less than or equal to 0.1% by weight relative to the weight of said component.

Example 2

Preparation of the —OH Component

The various ingredients constituting the —OH component are mixed in the proportions shown in table 1, at a temperature ranging from 20° C. to 80° C., in a reactor maintained under constant stirring and under nitrogen.

After homogenization of the mixture (about 3 hours), the content of OH group in the —OH component, expressed in milligrams of KOH per gram of —OH component (mg KOH/g), is measured.

Example 3

Preparation of the Adhesive Composition

The —NCO component prepared in example 1 and the —OH component prepared in example 2 were mixed.

Mixing is performed using a 50 ml twin cartridge at a temperature of about 23° C.

TABLE 1

| | | | Example according to the invention |
|---|---|---|---|
| —NCO component | PU bearing NCO end | Scuranate ® T100 | 16.1 |
| | | Dekatol 3008 | 5.3 |

TABLE 1-continued

|  |  | Example according to the invention |
|---|---|---|
| groups | Voranol ® P400 | 20.5 |
|  | NCO/OH mole ratio ($r_1$) | 1.75 |
|  | % NCO | 7.8 |
|  | Tolonate HDB-LV | 55.4 |
|  | Crayvallac SLT | 2.7 |
| Total of the ingredients of the —NCO component | | 100 |
| NCO weight % of the NCO component | | 16.3 |
| Density g/cm3 | | 1.1 |
| —OH component | Voranol P1010 | 19.7 |
|  | Dianol 330 | 8.7 |
|  | Lupranol 3402 | 24.4 |
|  | Borchi KAT 315 | 0.8 |
|  | Dabco 33-LV | 0.5 |
|  | Siliporite SA 1720 | 8.5 |
|  | Aerosil R202 | 2.0 |
|  | Omya ® BL 200 | 32.1 |
|  | Crayvallac SLT | 3.1 |
| Total of the ingredients of the —OH component | | 100 |
| Density g/cm3 | | 1.36 |
| Mixture of —OH and —NCO components | NCO/OH mole ratio | 1.10 |
|  | Mixture volume ratio | 1/1 |
|  | Mixture weight ratio | 136/110 |

Example 4

Evaluation of the Performance

Creep test: The composition was extruded from a two-component cartridge (comprising the —OH component, on the one hand, and the —NCO component, on the other hand) through a static mixer in order to vertically deposit a bead with a cross section of 1 cm and over a length of 10 to 20 cm.

The bead was checked visually to see whether or not any creep took place (dimensional stability of the bead).

Pot life: This time is estimated using a medical wooden tongue spatula or tongue depressor (150 mm×19 mm×1.5 mm, rounded ends) in a crucible according to the following protocol:

The —OH and —NCO components were stabilized beforehand at 23° C. 10 g of mixture of said —NCO and —OH components are weighed out, in a 1/1 volume ratio.

The pot life is the time beyond which no further transfer of adhesive onto the wooden spatula is observed (no more strands). It is evaluated by periodically dipping a new spatula into 1 mm of the mixture, starting from 50% of the theoretical pot life.

The Intrinsic Mechanical Performance Tests were Performed According to the Standard ISO 37 (2012).

The measurement of the elongation at break by a tensile test was performed according to the protocol described below.

The principle of the measurement consists in drawing, in a tensile testing device, the movable jaw of which moves at a constant speed equal to 10 mm/minute, a standard test specimen consisting of the crosslinked composition and in recording, at the moment when the test specimen breaks, the tensile stress applied (in MPa) and also the elongation of the test specimen (in %). The standard test specimen is dumbbell-shaped, as illustrated in the international standard ISO 37. The narrow part of the dumbbell used has a length of 20 mm, a width of 4 mm and a thickness of 3 to 4 mm.

The Adhesion Tests were Performed According to the Standard ISO 4587 (2003).

The test specimens were conditioned for at least seven days before the tests in an air-conditioned room at 23° C. and 50% relative humidity. The composition was stored, prior to the adhesive bonding, for at least 24 hours at 23±1° C.

The composition was conditioned at 23° C. and deposited, using a two-cartridge gun, onto the end of one of the test specimens over an area of 25.0×12.5 mm², thickness: 1.0 mm (adjustment with thickness wedges). Another test specimen was positioned in the axis of the first, and the assembly was pressed together firmly. Each test specimen was maintained using a clamp, for the seven days of crosslinking.

After seven days of crosslinking at 23° C. and 50% RH (relative humidity), the tensile test was performed using a tensile testing machine at 10 mm/minute. Five measurements were taken, and an average was calculated.

Shore A and D Hardnesses

The Shore A and D hardnesses were measured according to the standard ISO 7619. The composition was poured into a polyethylene capsule at least 5 mm deep. Crosslinking took place for 7 days at 23° C. and 50% RH. On the chosen hardness meter (A or D), the value measured was recorded after 15 seconds. Two measurements were taken, and an average was calculated.

The properties obtained for the compositions prepared are summarized in table 2 below:

TABLE 2

|  |  |  | Composition according to the invention |
|---|---|---|---|
| Creep test - 1 cm bead |  |  | No creep |
| Pot life (minutes) |  |  | 2 |
| Shore A hardness (23° C. - 50% RH) |  | After 10 minutes | 81 |
|  |  | After 20 minutes | 87 |
| Shore D hardness (23° C. - 50% RH) |  | After 10 minutes | 41 |
|  |  | After 20 minutes | 45 |
| Intrinsic mechanical performance tests (23° C. - 50% RH) |  | Tensile modulus (MPa) | 16 |
|  |  | Elongation at break (%) | 83 |
| Adhesion tests (23° C. - 50% RH) | Breaking strength (MPa) | ABS/ABS | 4.3 |
|  |  | Beech wood/beech | 10 |
|  |  | Polycarbonate/ Polycarbonate | 7.7 |
|  |  | Galvanized steel/ galvanized steel | 4 |

The composition according to the invention advantageously leads, after mixing of the OH and NCO components, to an absence of creep after application, notably in the vertical position. In addition, the composition advantageously gives an adhesive seal with good mechanical and adhesive properties.

The illustrated composition advantageously allows a very rapid increase in cohesion (very short pot life) and high Shore A and D hardnesses, advantageously making it possible to handle and/or to sand down and/or to cut the assemblies obtained rapidly after application.

The invention claimed is:
1. A composition comprising:
an —NCO component comprising:
A. at least one polyurethane including at least two NCO end groups obtained by a polyaddition reaction:
of a composition comprising at least one diisocyanate; and of a composition comprising at least one polyol; and
B. at least one polyisocyanate comprising at least three isocyanate —NCO functions selected from the group consisting of biurets, isocyanurates, adducts of diisocyanates and of triols, and mixtures thereof;
an —OH component comprising:
at least two polyols P1 each having a number-average molecular mass strictly less than 500 g/mol, said polyols P1 being such that:
at least one polyol P1 comprises at least three hydroxyl functions; and
at least one polyol P1 comprises at least two hydroxyl functions; and
at least one polyol P2 having a number-average molecular mass strictly greater than 1000 g/mol, and
at least one rheological agent,
wherein the —NCO component comprises a total content of polyisocyanate(s) comprising at least three —NCO functions B) ranging from 40% to 95% by weight, relative to the total weight of the —NCO component.

2. The composition as claimed in claim 1, wherein the —OH component comprises at least one rheological agent, and the —NCO component comprises at least one rheological agent which may be identical to or different from that of the —OH component.

3. The composition as claimed in claim 1, wherein the rheological agent is chosen from thixotropic agents.

4. The composition as claimed in claim 1, wherein:
the total content of rheological agent(s) in the —OH component ranges from 0% to 10% by weight, relative to the total weight of the —OH component; and/or
the total content of rheological agent(s) in the —NCO component ranges from 0% to 10% by weight, relative to the total weight of the —NCO component and
at least one of the OH component and the NCO component comprises a rheological agent.

5. The composition as claimed in claim 1, wherein the polyols P1 each have a number-average molecular mass ranging from 100 g/mol to less than 500 g/mol.

6. The composition as claimed in claim 1, wherein the at least one polyol P2 has a number-average molecular mass of less than or equal to 10 000 g/mol.

7. The composition as claimed in claim 1, wherein the at least one polyol P2 is selected from polyester polyols, polyether polyols, polyene polyols, polycarbonate polyols, poly(ether-carbonate) polyols, and mixtures thereof.

8. The composition as claimed in claim 1, wherein the —OH component comprises at least one additive selected from the group consisting of plasticizers, catalysts, solvents, pigments, adhesion promoters, moisture absorbers, UV stabilizers, antioxidants, dyes, fillers, and mixtures thereof.

9. The composition as claimed in claim 1, wherein the —OH component comprises at least one catalyst chosen from the group consisting of:
organometallic catalysts;
tertiary amines; and
mixtures thereof.

10. The composition as claimed in claim 1, wherein the —OH component comprises at least one filler, the total amount of filler(s) ranging from 1% to 50% by weight, relative to the total weight of the —OH component.

11. The composition as claimed in claim 1, wherein the polyurethane A) including at least two NCO end groups is obtained by polyaddition reaction:
of a composition comprising at least one diisocyanate; and
of a composition comprising at least one polyol;

wherein the diisocyanate monomer(s) is selected from the group consisting of:
isophorone diisocyanate (IPDI),
toluene diisocyanate (TDI);
the hydrogenated form of TDI,
diphenylmethane diisocyanate (MDI);
the hydrogenated form of MDI; and
mixtures thereof;
and said polyol is selected from the group consisting of polyether polyols, polyester polyols, and mixtures thereof.

12. The composition as claimed in claim 1, wherein the amounts of isocyanate monomer(s) and of polyol(s) used in the synthesis of the polyurethane A) are such that the NCO/OH mole ratio, denoted $r_1$, ranges from 1.5 to 2.

13. The composition as claimed in claim 1, wherein the at least three isocyanate NCO functions of the at least one polyisocyanate of B) are selected from the group consisting of biurets, isophorone diisocyanate (IPDI), pentamethylene diisocyanate (PDI), meta-xylylene diisocyanate (m-XDI) and hydrogenated meta-xylylene diisocyanate (m-HXDI).

14. The composition as claimed in claim 1, wherein it is an adhesive composition.

15. A composition comprising:
an —NCO component comprising:
A. at least one polyurethane including at least two NCO end groups obtained by a polyaddition reaction:
of a composition comprising at least one diisocyanate; and
of a composition comprising at least one polyol; and
B. at least one polyisocyanate comprising at least three isocyanate —NCO functions selected from the group consisting of biurets, isocyanurates, adducts of diisocyanates and of triols, and mixtures thereof;
an —OH component comprising:
at least two polyols P1 each having a number-average molecular mass strictly less than 500 g/mol, said polyols P1 being such that:
at least one polyol P1 comprises at least four hydroxyl functions; and
at least one polyol P1 comprising two hydroxyl functions; and
at least one polyol P2 having a number-average molecular mass strictly greater than 1000 g/mol, and
at least one rheological agent.

16. A composition comprising:
an —NCO component comprising:
A. at least one polyurethane including at least two NCO end groups obtained by a polyaddition reaction:
of a composition comprising at least one diisocyanate; and
of a composition comprising at least one polyol; and
B. at least one polyisocyanate comprising at least three isocyanate —NCO functions selected from the group consisting of biurets, isocyanurates, adducts of diisocyanates and of triols, and mixtures thereof;
an —OH component comprising:
at least two polyols P1 each having a number-average molecular mass strictly less than 500 g/mol, said polyols P1 being such that:
at least one polyol P1 comprises at least three hydroxyl functions; and
at least one polyol P1 comprises at least two hydroxyl functions; and at least one polyol P2 having a number-average molecular mass strictly greater than 1000 g/mol, and at least one rheological agent, wherein the —NCO component comprises B) a mixture of polyisocyanates, each of said polyisocyanates of the mixture comprising at least three NCO functions, the mean NCO functionality of said mixture of polyisocyanates being greater than or equal to 3.

* * * * *